United States Patent
Barakatain et al.

(10) Patent No.: US 10,196,126 B2
(45) Date of Patent: Feb. 5, 2019

(54) RIB STRUCTURE AND METHOD OF FORMING THEREOF

(71) Applicant: The Boeing Company, Huntington Beach, CA (US)

(72) Inventors: Mohammad Barakatain, Mukilteo, WA (US); Eric J. Schulze, Hockessin, DE (US); Mohssen Mohaghegh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 50 days.

(21) Appl. No.: 14/680,125

(22) Filed: Apr. 7, 2015

(65) Prior Publication Data

US 2016/0297511 A1    Oct. 13, 2016

(51) Int. Cl.
| | |
|---|---|
| *B64C 3/18* | (2006.01) |
| *B64C 3/26* | (2006.01) |
| *B64C 1/06* | (2006.01) |
| *B64C 1/00* | (2006.01) |
| *B64F 5/10* | (2017.01) |

(52) U.S. Cl.
CPC .............. *B64C 3/187* (2013.01); *B64C 1/06* (2013.01); *B64C 3/26* (2013.01); *B64F 5/10* (2017.01); *B64C 2001/0072* (2013.01); *Y02T 50/433* (2013.01)

(58) Field of Classification Search
CPC ..... B64F 5/10; B64C 1/06; B64C 3/26; B64C 2001/0072; B64C 3/182; B64C 3/185; B64C 3/187; Y02T 50/433

USPC ......... 244/123.1, 123.2, 123.3, 123.4, 123.7, 244/123.8, 123.9, 124, 119, 120
See application file for complete search history.

(56) References Cited

U.S. PATENT DOCUMENTS

| | | | |
|---|---|---|---|
| 2,367,750 A | | 1/1945 | Berkow et al. |
| 3,827,661 A | * | 8/1974 | Ryan .................. B64C 3/00 244/123.8 |
| 5,993,941 A | | 11/1999 | Vasiliev et al. |

(Continued)

FOREIGN PATENT DOCUMENTS

| | | |
|---|---|---|
| EP | 1288124 A1 | 3/2003 |
| GB | 2417228 A | 2/2006 |

(Continued)

OTHER PUBLICATIONS

EP Extended Search Report for related application 16153582.8 dated Aug. 10, 2016; 10 pp.

(Continued)

*Primary Examiner* — Theodore V Adamos
(74) *Attorney, Agent, or Firm* — Armstrong Teasdale LLP

(57) ABSTRACT

A rib structure for use in an aircraft is provided. The rib structure includes a web portion, a plurality of hat stiffener portions coupled to the web portion, and at least one chord portion coupled to the web portion. The plurality of hat stiffener portions extend substantially parallel, and the at least one chord portion extends substantially perpendicularly relative to the plurality of hat stiffener portions. Moreover, the web portion, the plurality of hat stiffener portions, and the at least one chord portion are fabricated from composite material, and include features such that the rib structure has a buckling ratio of at least about 4.

19 Claims, 8 Drawing Sheets

(56) References Cited

U.S. PATENT DOCUMENTS

| | | | |
|---|---|---|---|
| 7,134,629 B2* | 11/2006 | Johnson | B61D 17/041 244/119 |
| 7,686,251 B2* | 3/2010 | Tanner | B64C 3/187 244/123.1 |
| 7,967,248 B2 | 6/2011 | Halme et al. | |
| 8,074,929 B1 | 12/2011 | Kulesha | |
| 8,186,622 B2* | 5/2012 | Munday | B64C 3/18 244/123.1 |
| 2003/0042364 A1* | 3/2003 | Tanaka | B64C 3/20 244/123.2 |
| 2007/0023573 A1* | 2/2007 | Neale | B64C 3/00 244/124 |
| 2008/0128552 A1* | 6/2008 | Namaizawa | B64C 3/18 244/123.1 |
| 2009/0272848 A1* | 11/2009 | Munday | B64C 3/18 244/131 |
| 2015/0053818 A1* | 2/2015 | Charles | B64C 3/182 244/124 |
| 2016/0207607 A1* | 7/2016 | Charles | B64C 1/064 |

FOREIGN PATENT DOCUMENTS

| | | |
|---|---|---|
| WO | 02066235 A1 | 8/2002 |
| WO | 2007110586 A1 | 10/2007 |
| WO | 2008037847 A1 | 4/2008 |

OTHER PUBLICATIONS

EPO Examination Report for related application 16153582.8 dated Aug. 28, 2018; 5 pp.

* cited by examiner

RIB STRUCTURE AND METHOD OF FORMING THEREOF

BACKGROUND

The field of the present disclosure relates generally to aircraft assemblies and, more specifically, to stiffening members for use in aircraft assemblies.

An aircraft generally includes at least two wings coupled to a fuselage. At least some known wings include a front spar and a rear spar, and a plurality of rib structures coupled to the front and rear spars. The rib structures at least partially define the framework of each wing, and are spaced from each other at regular intervals along the wing. Moreover, the rib structures are generally fabricated from a metallic material, and at least some known metallic rib structures include a post-buckled web and a plurality of stiffening members. The stiffening members are coupled to the post-buckled web with a plurality of fasteners, which add weight to the rib structure, and which can be a time-consuming and laborious task to install.

BRIEF DESCRIPTION

In one aspect, a rib structure for use in an aircraft is provided. The rib structure includes a web portion, a plurality of hat stiffener portions coupled to the web portion, and at least one chord portion coupled to the web portion. The plurality of hat stiffener portions extend substantially parallel, and the at least one chord portion extends substantially perpendicularly relative to the plurality of hat stiffener portions. Moreover, the web portion, the plurality of hat stiffener portions, and the at least one chord portion are fabricated from composite material, and include features such that the rib structure has a buckling ratio of at least about 4.

In another aspect, a stiffening member for use in a vehicle is provided. The stiffening member includes a web portion, and a plurality of hat stiffener portions coupled to the web portion. At least one hat stiffener portion of the plurality of hat stiffener portions includes a base portion coupled to the web portion, a pair of riser portions extending from the base portion, and at least one ligament portion extending between the pair of riser portions such that a slot is defined between the pair of riser portions.

In yet another aspect, a method of forming a rib structure for use in an aircraft is provided. The method includes coupling a plurality of hat stiffener portions to a web portion of the rib structure, and coupling at least one chord portion to the web portion. The plurality of hat stiffener portions extend substantially parallel relative to each other, the at least one chord portion extends substantially perpendicularly relative to the plurality of hat stiffener portions. Moreover, the web portion, the plurality of hat stiffener portions, and the at least one chord portion are fabricated from composite material, and include features such that the rib structure has a buckling ratio of at least about 4.

DETAILED DESCRIPTION

The implementations described herein relate to stiffening members for use in aircraft assemblies. More specifically, the stiffening members are manufactured from multiple integral components, such as a web portion, a plurality of hat stiffener portions, and at least one chord portion. The components are fabricated from composite material, and each has one or more mechanical features that, when implemented in combination with the composite material, enable the stiffening members to have a buckling ratio of at least about 4. For example, in one implementation, the web portion includes localized reinforcement structures formed from additional plies of composite material that enable the remainder of the web portion to be thinner. Moreover, the hat stiffening portions include a slotted configuration that allows torsional movement thereabout, and the chord portion includes a contoured configuration that provides efficient reinforcement to the web portion. The mechanical features described herein can be used either alone or in combination to improve the performance of the stiffening member. As such, stiffening members having a lighter weight and better compatibility with a composite aircraft wing are formed, when compared to similar metallic counterparts. Moreover, while described in the context of a rib structure for use in the wing of an aircraft, it should be understood that the following description is applicable to any suitable stiffening member.

Figure 1:
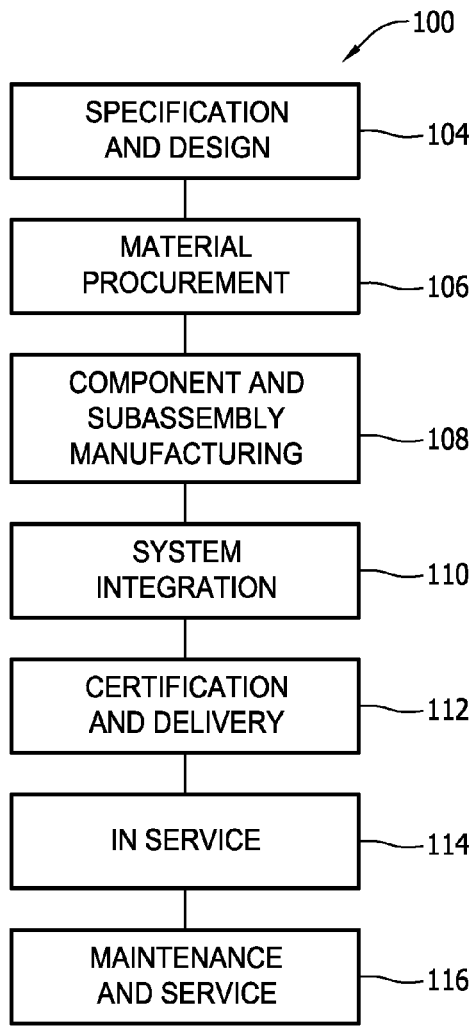
FIG. 1 is a flow diagram of an exemplary aircraft production and service method.
Figure 2:
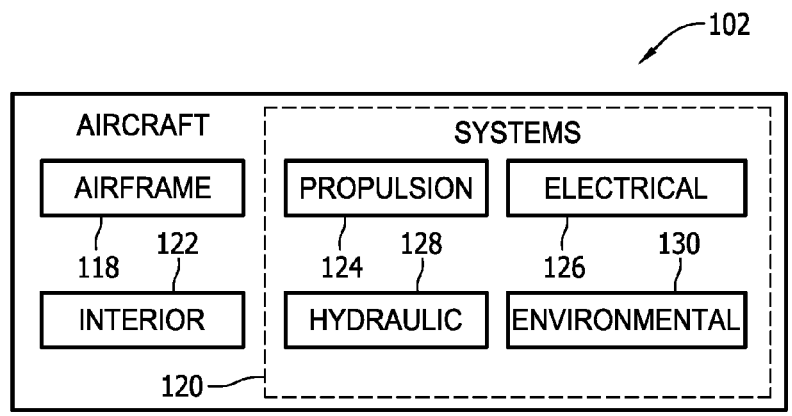
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
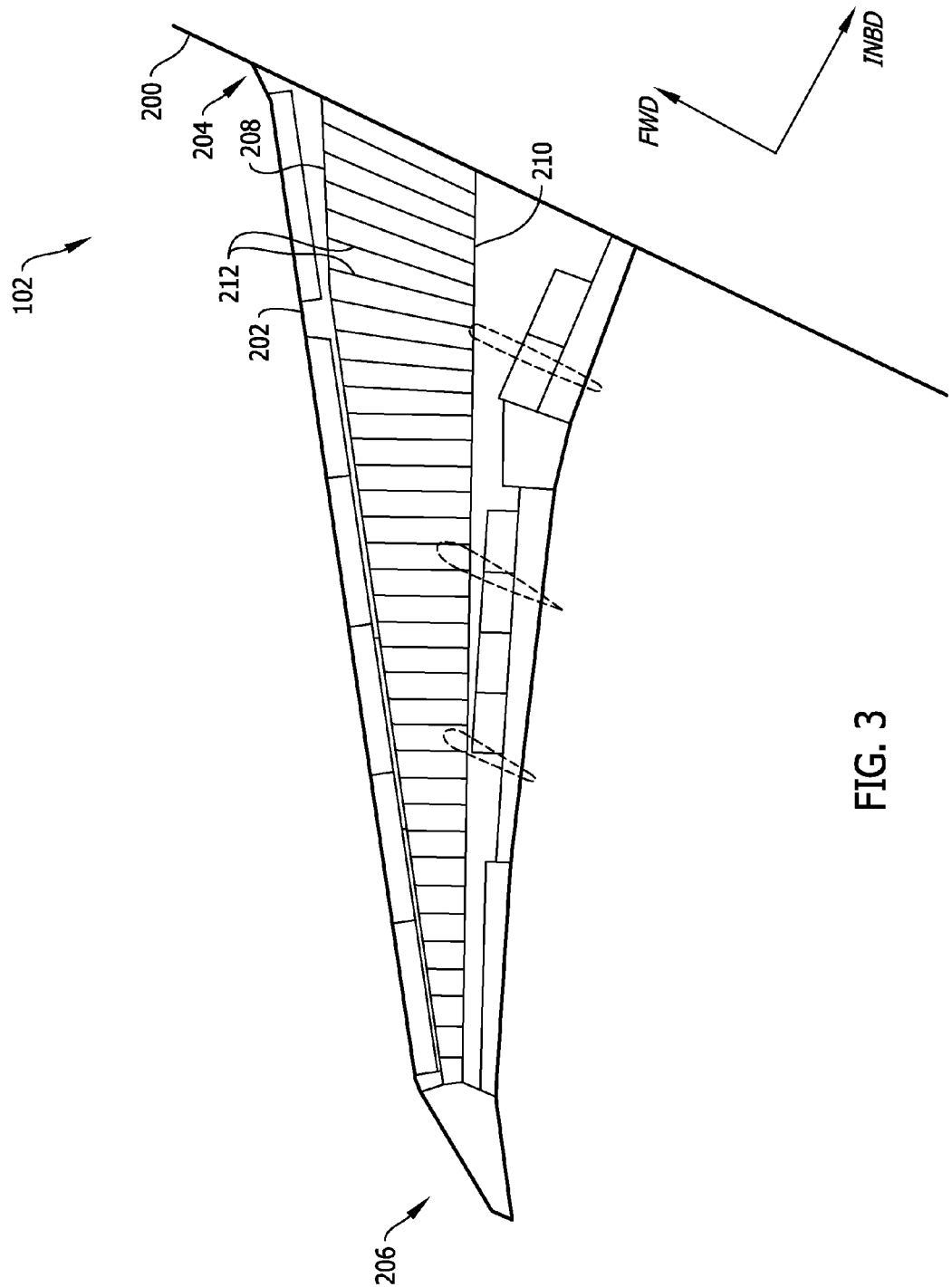
FIG. 3 is schematic illustration of a portion of an exemplary aircraft.

FIG. 3 is schematic illustration of a portion of aircraft 102. In the exemplary implementation, aircraft 102 includes a fuselage 200 and a wing 202 extending from fuselage 200. More specifically, wing 202 includes a first end 204 coupled to fuselage 200, and a second end 206 extending from fuselage 200. Wing 202 also includes a front spar 208 and a rear spar 210 that each extend from fuselage 200 towards second end 206 of wing 202. A plurality of rib structures 212 extend between front and rear spars 208 and 210, and rib structures 212 are spaced apart from each other at intervals along the span of wing 202.

Figure 4:
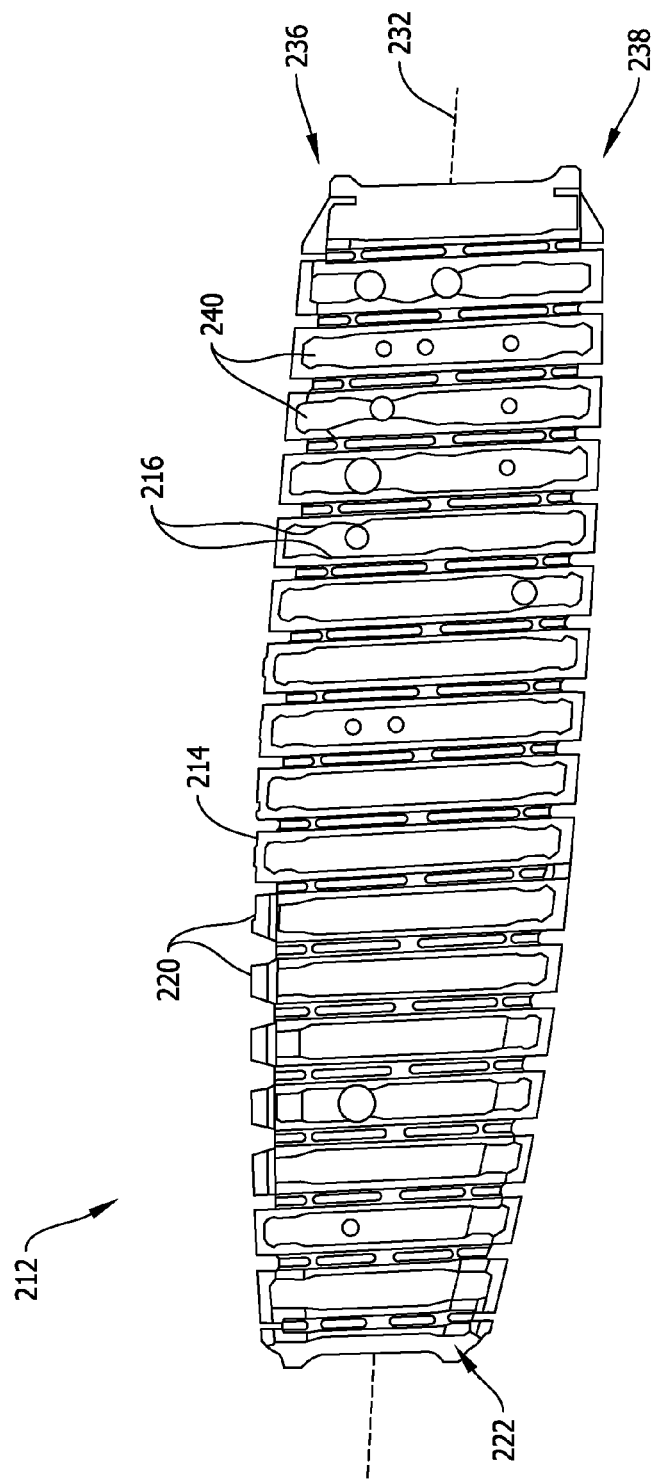
FIG. 4 is a schematic illustration of an exemplary rib structure that may be used in a wing of the aircraft shown in FIG. 3.
Figure 5:
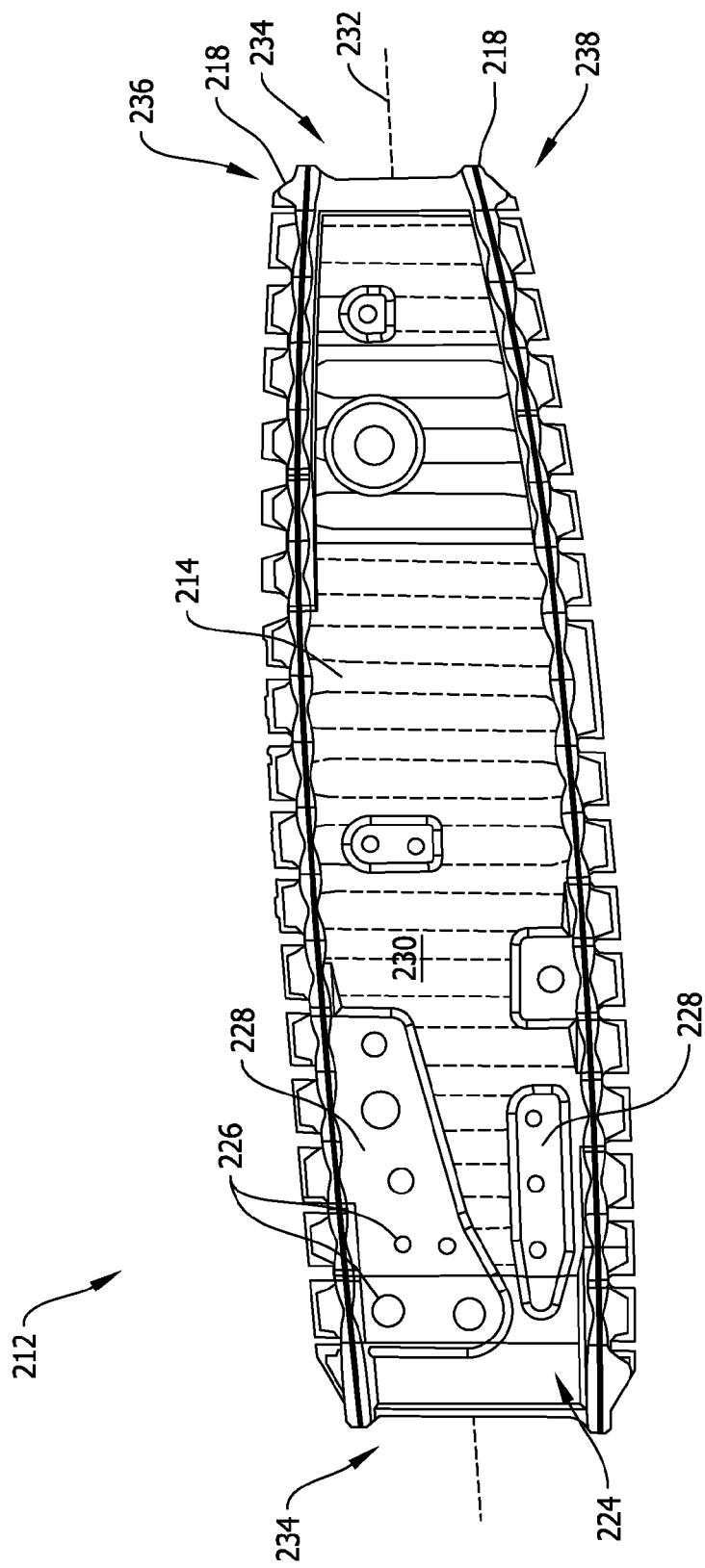
FIG. 5 is another schematic illustration of the rib structure shown in FIG. 4.

FIG. 4 is a schematic illustration of rib structure 212 that may be used in wing 202 of aircraft 102 (each shown in FIG. 3), and FIG. 5 is another schematic illustration of rib structure 212. In the exemplary implementation, rib structure 212 is integrally formed from a plurality of components and includes a web portion 214, a plurality of hat stiffener portions 216 coupled to web portion 214, and at least one chord portion 218 coupled to web portion 214. Rib structure 212 also includes a plurality of shear ties 220 for coupling rib structure 212 to a wing skin (not shown). Hat stiffener portions 216 are coupled on a first side 222 of web portion 214, and chord portions 218 are coupled on an opposing second side 224 of web portion 214. Coupling hat stiffener portions 216 and chord portions 218 on opposing sides 222 and 224 of web portion 214 ensures hat stiffener portions 216 and chord portions 218 extend substantially continuously along web portion 214 with a simplified geometry.

Web portion 214, hat stiffener portions 216, and chord portions 218 may be fabricated from any material that enables rib structure 212 to function as described herein. In the exemplary implementation, web portion 214, hat stiffener portions 216, and chord portions 218 are each fabricated from at least one ply of composite material, such as carbon fiber reinforced polymer. The combination of forming rib structure 212 from composite material and the various mechanical features of web portion 214, hat stiffener portions 216, and chord portions 218 enable rib structure 212 to have a buckling ratio of at least about 4, and in one implementation, can achieve a buckling ratio of up to about 10, which will be described in more detail below.

Referring to FIG. 5, web portion 214 includes a plurality of holes 226 defined therein, such that systems components can pass therethrough. Web portion 214 also includes reinforcement structures 228 formed from at least one ply of composite material applied at predetermined regions along a surface 230 of web portion 214. The at least one ply of composite material is in addition to the plies of composite material used to form the remainder of web portion 214, and increases a thickness of web portion 214 at the predetermined regions. In the exemplary implementation, the predetermined regions generally correspond to areas around holes 226 defined in web portion 214. Moreover, reinforcement structures 228 are positioned on second side 224 of web portion 214 to ensure hat stiffener portions 216 extend substantially continuously along web portion 214 with a simplified geometry.

The at least one ply of composite material in reinforcement structures 228 are applied to web portion 214 in any orientation that enables rib structure 212 to function as described herein. For example, when oriented in the ±45° directions relative to a centerline 232 of rib structure 212, the at least one ply provides additional shear stiffness to web portion 214. When oriented in the 90° direction relative to centerline 232, the at least one ply provides additional crush resistance to web portion 214 in a normal direction relative to centerline 232. Moreover, when positioned at distal ends 234 of web portion 214, reinforcement structures 228 facilitate reacting bearing loads induced on rib structure 212 from front and rear spars 208 and 210 (shown in FIG. 3).

Web portion 214 also includes an upper portion 236 and a lower portion 238. Each of upper and lower portions 236 and 238 include a plurality of arm members 240 defined therealong, such that a plurality of stringer slots 242 are defined between adjacent arm members 240 in upper and lower portions 236 and 238. Stringer slots 242 are sized to receive at least a portion of a stringer (not shown). Moreover, hat stiffener portions 216 and chord portions 218 are aligned in a predetermined orientation relative to stringer slots 242 to facilitate strengthening rib structure 212. For example, in the exemplary implementation, each hat stiffener portion 216 extends between corresponding stringer slots 242 in upper and lower portions 236 and 238 that are substantially aligned in the normal direction relative to centerline 232. Moreover, as will be described in more detail below, thicker portions of chord portions 218 substantially align with stringer slots 242 in the normal direction relative to centerline 232. As such, additional reinforcement is provided to regions of web portion 214 potentially subjected to increased loads, when compared to other regions of web portion 214.

Figure 6:
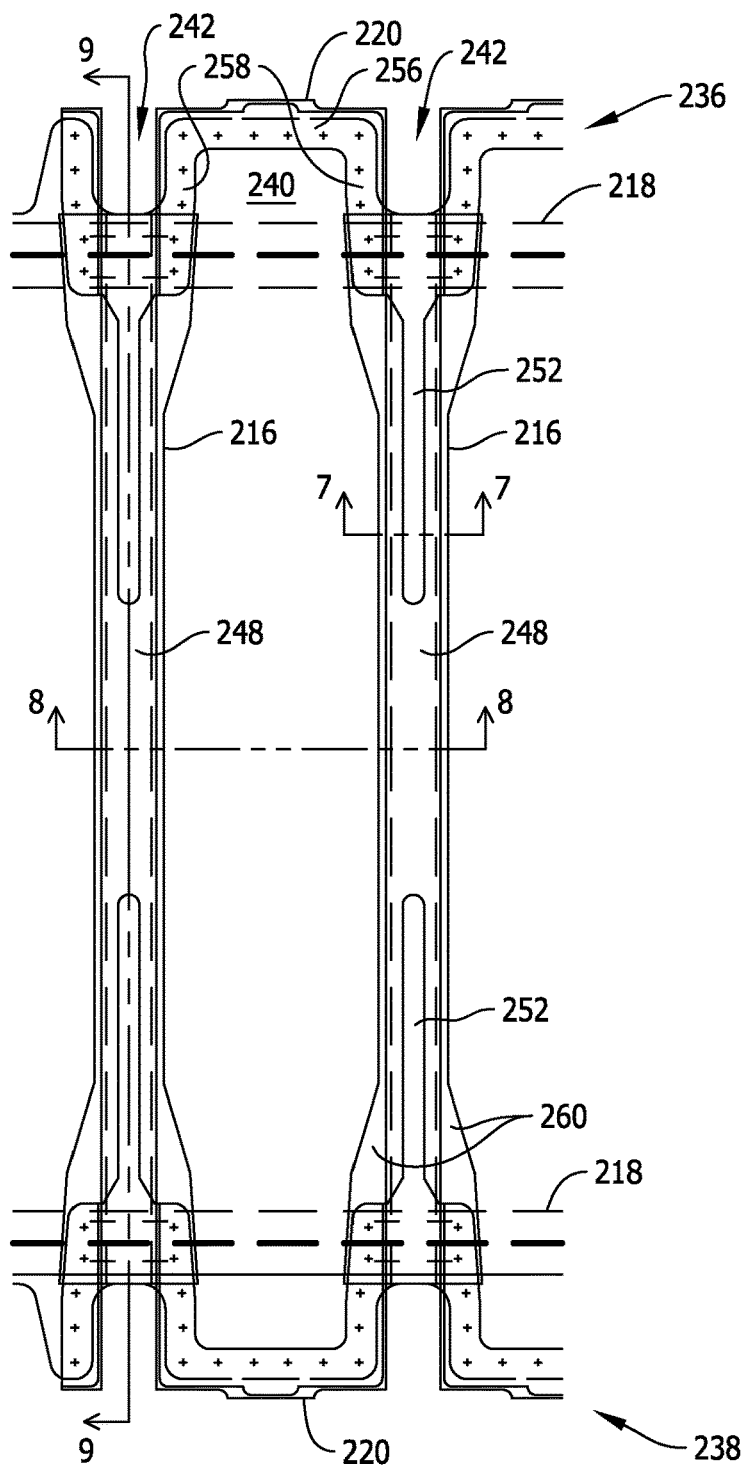
FIG. 6 is an enlarged schematic illustration of a portion of the rib structure shown in FIG. 4.
Figure 7:
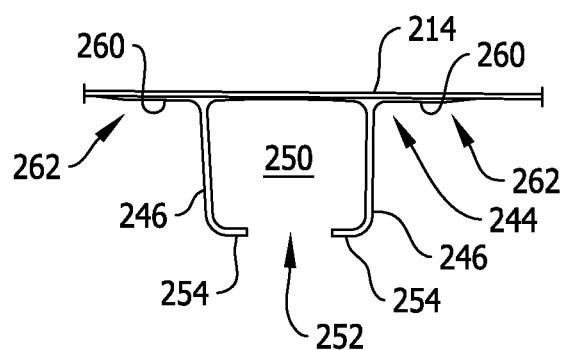
FIG. 7 is a schematic cross-sectional illustration of the rib structure shown in FIG. 6 taken along Line 7-7.
Figure 8:
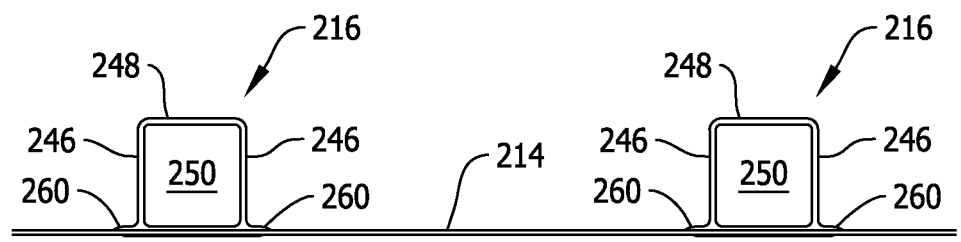
FIG. 8 is a schematic cross-sectional illustration of the rib structure shown in FIG. 6 taken along Line 8-8.
Figure 9:
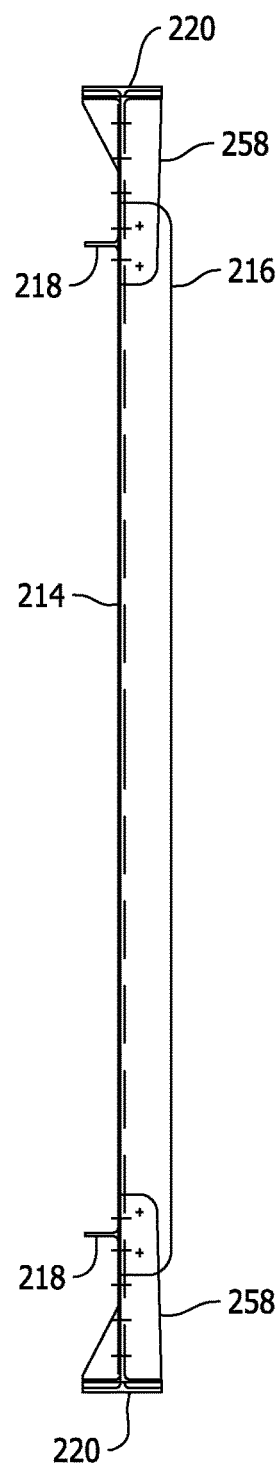
FIG. 9 is a schematic cross-sectional illustration of the rib structure shown in FIG. 6 taken along Line 9-9.

FIG. 6 is an enlarged schematic illustration of a portion of rib structure 212 (shown in FIG. 4), FIG. 7 is a schematic cross-sectional illustration of rib structure 212 taken along line 7-7 (shown in FIG. 6), FIG. 8 FIG. 8 is a schematic cross-sectional illustration of rib structure 212 (shown in FIG. 6) taken along Line 8-8, and FIG. 9 FIG. 8 is a schematic cross-sectional illustration of rib structure 212 (shown in FIG. 6) taken along Line 9-9. In the exemplary implementation, hat stiffener portion 216 includes a base portion 244 coupled to web portion 214, a pair of riser portions 246 extending from base portion 244, and at least one ligament portion 248 extending between the pair of riser portions 246, such that a cavity 250 and a slot 252 are defined between the pair of riser portions 246. More specifically, referring to FIG. 7, cavity 250 is further defined by base portion 244, and hat stiffener portion 216 further includes a lip portion 254 extending from each riser portion 246 towards an opposing riser portion 246 in the pair. As such, lip portions 254 at least partially define slot 252. Moreover, defining slot 252 between riser portions 246 increases the flexibility of hat stiffener portion 216, which facilitates reducing delamination of hat stiffener portion 216 from web portion 214 when subjected to increased buckling loads.

The number, size, and position of ligament portions 248 in hat stiffener portion 216 is based on a desired torsional stiffness and stability to be provided to hat stiffener portion 216. For example, as the number and/or size of ligament portions 248 increases, so does the torsional stiffness and stability of hat stiffener portion 216. As such, slot 252 provides access to structures and/or components within cavity 250, and also facilitates reducing the weight of hat stiffener portion 216.

As described above, rib structure 212 includes a plurality of shear ties 220 for coupling rib structure 212 to the wing skin of aircraft 102. In the exemplary implementation, each shear tie 220 includes a base portion 256 and a pair of leg portions 258 extending therefrom. Base portion 256 couples to arm member 240 of web portion 214, and each leg portion 258 couples to an adjacent hat stiffener portion 216. Leg portions 258 extend in a substantially collinear direction with a flange 260 of base portion 244 of hat stiffener portion 216. As such, an efficient load path between leg portions 258 and hat stiffener portion 216 is formed such that additional reinforcement is not required in other areas of web portion 214.

Referring to FIG. 7, base portion 244 includes flange 260 extending along surface 230 of web portion 214. Flange 260 includes a tapered region 262 that decreases in thickness as flange 260 extends from the pair of riser portions 246. As such, flange 260 reduces a likelihood of base portion 244 from delaminating from web portion 214 by facilitating a gradual load transition into web portion 214.

Figure 10:
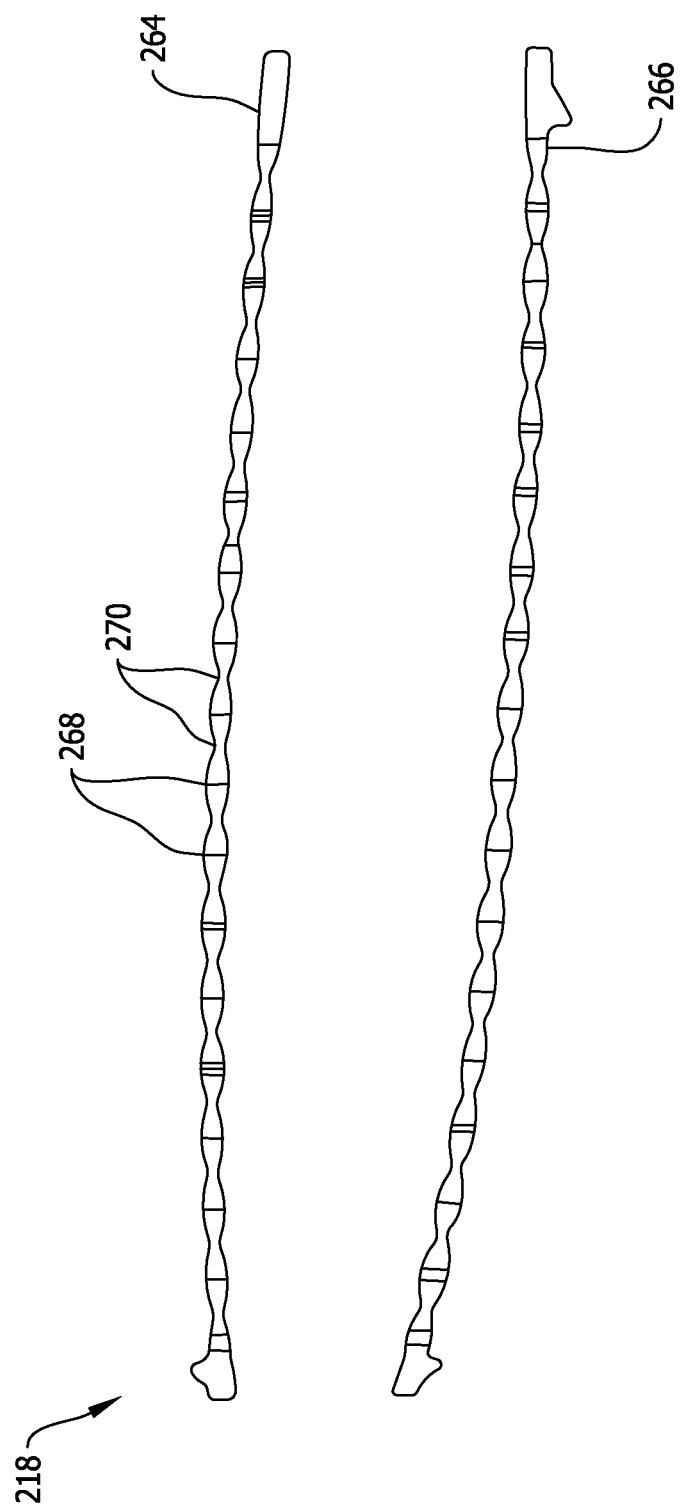
FIG. 10 is a schematic illustration of an exemplary chord portion that may be used with the rib structure shown in FIG. 5.

FIG. 10 is a schematic illustration of exemplary chord portions 218 that may be used with rib structure 212 (shown in FIG. 5). In the exemplary implementation, chord portions 218 include a first chord portion 264 that extends along upper portion 236 of web portion 214, and a second chord portion 266 that extends along lower portion 238 of web portion 214 (each shown in FIG. 4). Each chord portion 218 has a contoured configuration that includes a plurality of thicker portions 268 and a plurality of thinner portions 270 in an alternating arrangement along a length of each chord portion 218.

Referring again to FIG. 4, chord portions 218 are oriented relative to web portion 214 such that thicker portions 268 reinforce predetermined regions of web portion 214. For example, in one implementation, thicker portions 268 substantially align with each stringer slot 242 in the normal direction relative to centerline 232. Moreover, chord portions 218 are fabricated from at least one ply of composite material in any orientation that enables rib structure 212 to function as described herein. When oriented in the 90° direction relative to centerline 232, the at least one ply of chord portions 218 provide additional crush resistance to web portion 214 in the normal direction relative to centerline 232. In an alternative implementation, thicker portions 268 have a substantially similar profile as arm portions 240, and thicker portions 268 are substantially aligned with arm portions 240 when chord portions 218 are coupled to web portion 214.

A method of forming a stiffening member, such as rib structure 212, is also described herein. The method includes coupling a plurality of hat stiffener portions 216 to web portion 214 of rib structure 212, and coupling at least one chord portion 218 to web portion 214. The plurality of hat stiffener portions 216 extend substantially parallel relative to each other, and the at least one chord portion 218 extends substantially perpendicular relative to the plurality of hat stiffener portions 216. Web portion 214, the plurality of hat stiffener portions 216, and at the least one chord portion 218 are fabricated from composite material, and include features such that rib structure 212 has a buckling ratio of greater than about 4, and up to about 10.

In some implementations, coupling a plurality of hat stiffener portions 216 includes co-curing the plurality of hat stiffener portions 216 with web portion 214. Moreover, coupling at least one chord portion includes co-bonding the at least one chord portion 218 with web portion 214. Co-curing hat stiffener portion 216 having tapered region 262 with web portion 214 facilitates forming a high quality bondline being between stiffener portion 216 and web portion 214. Co-bonding chord portion 218 with web portion 214 facilitates simplifying the process of contouring chord portion 218. As such, co-bonding and/or co-curing hat stiffener portions 216 and chord portions 218 with web portion 214 facilitates forming a unitary rib structure 212 using a reduced amount of fasteners when compared to similar metallic counterparts.

The method also includes coupling the plurality of hat stiffener portions 216 on first side 222 of web portion 214, and coupling the at least one chord portion 218 on the opposing second side 224 of web portion 214. In one implementation, the method further includes extending the plurality of hat stiffener portions 216 between corresponding stringer slots 242 in the upper and lower portions 236 and 238 of web portion 214, wherein the corresponding stringer slots 242 are substantially aligned in the normal direction relative to centerline 232 of web portion 214. Moreover, the method includes orienting the at least one chord portion 218 such that thicker portions 268 of the at least one chord portion 218 substantially align with each stringer slot 242 in the normal direction relative to centerline 232 of web portion 214.

The implementations described herein relate to stiffening members for use in aircraft assemblies. In one implementation, the stiffening member is a rib structure for use in the wing of an aircraft, and the rib structure utilizes a variety of features that enable it to have improved buckling ratios when compared to similar metallic counterparts. For example, the rib structure and components thereof are fabricated from composite material. Moreover, each component in the rib structure includes mechanical features that provide reinforcement and torsional stiffness to the rib structure, for example. As such, the stiffening members described herein are lightweight and have increased buckling ratios when compared to similar metallic counterparts.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rib structure for use in an aircraft, said rib structure comprising:
   a web portion comprising a plurality of stringer slots;
   a plurality of hat stiffener portions coupled to said web portion, wherein said plurality of hat stiffener portions extend substantially parallel relative to each other; and
   at least one chord portion coupled to said web portion, wherein said at least one chord portion extends substantially perpendicularly relative to said plurality of hat stiffener portions, said at least one chord portion comprising a plurality of thicker portions and a plurality of thinner portions in an alternating arrangement along a length of said at least one chord portion, wherein said at least one chord portion is oriented such that said plurality of thicker portions are aligned with said plurality of stringer slots,
      wherein said web portion, said plurality of hat stiffener portions, and said at least one chord portion are fabricated from composite material.

2. The rib structure in accordance with claim 1, wherein at least one hat stiffener portion of said plurality of hat stiffener portions comprises:
   a base portion coupled to said web portion;
   a pair of riser portions extending from said base portion; and
   at least one ligament portion extending between said pair of riser portions such that a slot is defined between said pair of riser portions.

3. The rib structure in accordance with claim 2, wherein said at least one hat stiffener further comprises a lip portion extending from each riser portion towards an opposing riser portion of said pair of riser portions, wherein each said lip portion at least partially defines the slot.

4. The rib structure in accordance with claim 2, wherein said base portion comprises a flange extending along a surface of said web portion, said flange comprising a tapered region that decreases in thickness as said flange extends from said pair of riser portions.

5. The rib structure in accordance with claim 1, wherein said web portion comprises a reinforcement structure formed from at least one ply of the composite material applied at predetermined regions along a surface of said web portion.

6. The rib structure in accordance with claim 1, wherein said web portion comprises an upper portion and a lower portion that comprise a plurality of arm members and said plurality of stringer slots defined therebetween, wherein said plurality of hat stiffener portions extend between corresponding stringer slots in said upper and lower portions of said web portion, wherein said corresponding stringer slots are substantially aligned in a normal direction relative to a centerline of said web portion.

7. The rib structure in accordance with claim 1, wherein said plurality of hat stiffener portions are coupled on a first side of said web portion, and said at least one chord portion is coupled on an opposing second side of said web portion.

8. A stiffening member for use in a vehicle, said stiffening member comprising:
   a web portion comprising a plurality of stringer slots;
   a plurality of hat stiffener portions coupled to said web portion, wherein each hat stiffener portion is aligned with one of the plurality of stringer slots, and wherein at least one hat stiffener portion of said plurality of hat stiffener portions comprises:
      a base portion coupled to said web portion;
      a pair of riser portions extending from said base portion;
      at least one ligament portion extending between said pair of riser portions such that a cavity is defined between said pair of riser portions and said at least one ligament portion; and
      a lip portion extending from each riser portion and towards an opposing riser portion of said pair of riser portions such that a slot, having a width less than a distance between said pair of riser portions, is defined between each said lip portion.

9. The stiffening member in accordance with claim 8 further comprising at least one chord portion coupled to said web portion, wherein said at least one chord portion extends substantially perpendicularly relative to said plurality of hat stiffener portions.

10. The stiffening member in accordance with claim 9, wherein said plurality of hat stiffener portions are coupled on a first side of said web portion, and said at least one chord portion is coupled on an opposing second side of said web portion.

11. The stiffening member in accordance with claim 9, wherein said at least one chord portion has a contoured configuration that comprises a plurality of thicker portions and a plurality of thinner portions in an alternating arrangement along a length of said at least one chord portion.

12. The stiffening member in accordance with claim 8, wherein said base portion comprises a flange extending along a surface of said web portion, said flange comprising a tapered region that decreases in thickness as said flange extends from said pair of risers.

13. The stiffening member in accordance with claim 8, wherein the web portion comprises an upper portion and a lower portion, the plurality of stringer slots defined along the upper and lower portions, and each hat stiffener portion extending between corresponding stringer slots in the upper and lower portions.

14. A method of forming a rib structure for use in an aircraft, said method comprising:
   coupling a plurality of hat stiffener portions to a web portion of the rib structure, wherein the plurality of hat stiffener portions extend substantially parallel relative to each other, and wherein the web portion includes a plurality of stringer slots;
   coupling at least one chord portion to the web portion, wherein the at least one chord portion extends substantially perpendicularly relative to the plurality of hat stiffener portions, the at least one chord portion including a plurality of thicker portions and a plurality of thinner portions in an alternating arrangement along a length of the at least one chord portion,
      wherein the web portion, the plurality of hat stiffener portions, and the at least one chord portion are fabricated from composite material, and comprise features such that the rib structure has a buckling ratio of at least about 4; and
   orienting the at least one chord portion such that the plurality of thicker portions are aligned with the plurality of stringer slots.

15. The method in accordance with claim 14, wherein coupling a plurality of hat stiffener portions comprises co-curing the plurality of hat stiffener portions with the web portion.

16. The method in accordance with claim 14, wherein coupling at least one chord portion comprises co-bonding the at least one chord portion with the web portion.

17. The method in accordance with claim 14 further comprising:
- coupling the plurality of hat stiffener portions on a first side of the web portion; and
- coupling the at least one chord portion on an opposing second side of the web portion.

18. The method in accordance with claim 14, wherein the web portion includes a plurality of arm members and the plurality of stringer slots defined therebetween along upper and lower portions of the web portion, said method further comprising:
- extending the plurality of hat stiffener portions between corresponding stringer slots in the upper and lower portions of the web portion, wherein the corresponding stringer slots are substantially aligned in a normal direction relative to a centerline of the web portion.

19. The method in accordance with claim 14, wherein the web portion includes a plurality of arm members and the plurality of stringer slots defined therebetween along upper and lower portions of the web portion, said method further comprising:
- orienting the at least one chord portion such that thicker portions of the at least one chord portion substantially align with said stringer slots in a normal direction relative to a centerline of the web portion.

\* \* \* \* \*